US009691035B1

(12) United States Patent
Sandler

(10) Patent No.: US 9,691,035 B1
(45) Date of Patent: Jun. 27, 2017

(54) REAL-TIME UPDATES TO ITEM RECOMMENDATION MODELS BASED ON MATRIX FACTORIZATION

(71) Applicant: Amazon Technologies, Inc., Reno, NV (US)

(72) Inventor: Samuel Theodore Sandler, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 486 days.

(21) Appl. No.: 14/288,216

(22) Filed: May 27, 2014

Related U.S. Application Data

(60) Provisional application No. 61/979,380, filed on Apr. 14, 2014.

(51) Int. Cl.
*G06F 17/00* (2006.01)
*G06N 99/00* (2010.01)
*G06N 5/04* (2006.01)

(52) U.S. Cl.
CPC ............ *G06N 99/005* (2013.01); *G06N 5/04* (2013.01)

(58) Field of Classification Search
CPC ................................................ G06F 17/30699
USPC ....................................................... 706/12, 45
See application file for complete search history.

(56) References Cited

U.S. PATENT DOCUMENTS

| 8,131,732 B2 | 3/2012 | Yu et al. | |
| 2010/0100543 A1* | 4/2010 | Brady | G06F 17/30613 707/732 |
| 2012/0041769 A1* | 2/2012 | Dalal | G06Q 10/101 705/1.1 |
| 2013/0226839 A1 | 8/2013 | Archambeau et al. | |
| 2014/0236943 A1* | 8/2014 | Li | G06F 17/30699 707/736 |

FOREIGN PATENT DOCUMENTS

WO 2012013996 2/2012

OTHER PUBLICATIONS

"Fast Online SVD Revisions for Lightweight Recommender Systems", Matthew Brand, Mar. 2003, pp. 1-12.
(Continued)

*Primary Examiner* — David Vincent
(74) *Attorney, Agent, or Firm* — Robert C. Kowert; Meyertons, Hood, Kivlin, Kowert & Goetzel, P.C.

(57) ABSTRACT

A network-based enterprise or other system that makes items available for selection to users may implement real-time updates to item recommendation models based on matrix factorization. An item recommendation model may be maintained that is generated from a singular value decomposition of a matrix indicating selections of items by users. A user-specific update to the item recommendation model may be calculated in real-time for a particular user such that the calculation may be performed without performing another singular value decomposition to generate an updated version of the item recommendation model. Item recommendations may then be made based on the user-specific update and the item recommendation model. In various embodiments, the item recommendations may be made in response to an indication or request for item recommendations for the particular user.

21 Claims, 12 Drawing Sheets

(56) References Cited

OTHER PUBLICATIONS

"Incremental Singular Value Decomposition Algorithms for Highly Scalable Recommender Systems" Badrul Sarwar et al., 2002, pp. 1-6.
"Using Linear Algebra for Intelligent Information Retrieval", M.W. Berry et al., Dec. 1994, pp. 1-24.

* cited by examiner

REAL-TIME UPDATES TO ITEM RECOMMENDATION MODELS BASED ON MATRIX FACTORIZATION

RELATED APPLICATIONS

This application claims benefit of priority to U.S. Provisional Application Ser. No. 61/979,380, entitled "Real-Time Updates to Item Recommendation Models Based on Matrix Factorization," filed Apr. 14, 2014, and which is incorporated herein by reference in its entirety.

BACKGROUND

Consumer choices for goods and services have grown exponentially upon the advent of the digital age. E-commerce, content distribution networks, and other communication technologies have enabled customers to choose from many more goods than were previously available to them. However, navigating the sheer number products now available can prove daunting and ultimately discourage some customers from making purchases using these new means. Recommendation systems have been developed in order to provide customers with some assistance when choosing new products, especially if these products are not physically available to the customer at the moment when a purchase, selection, or ordering decision is made. A recommendation system may provide feedback or recommended items to a customer so that the customer may make a more informed decision as to whether or not an item may be a good purchase.

In order to create effective item recommendation systems, large amounts of past behavior of customers may be tracked and maintained. This customer data may be analyzed in order to make suggestions of items that, for example, other similar customers have purchased. As the amount of data used in generating item recommendations continues to grow however, these recommendation systems may become less agile. Recent purchases, views, or other selections may not be accounted for as many item recommendation techniques evaluate large sets of data in accordance with processes that take significant amounts of time.

Figure 1:
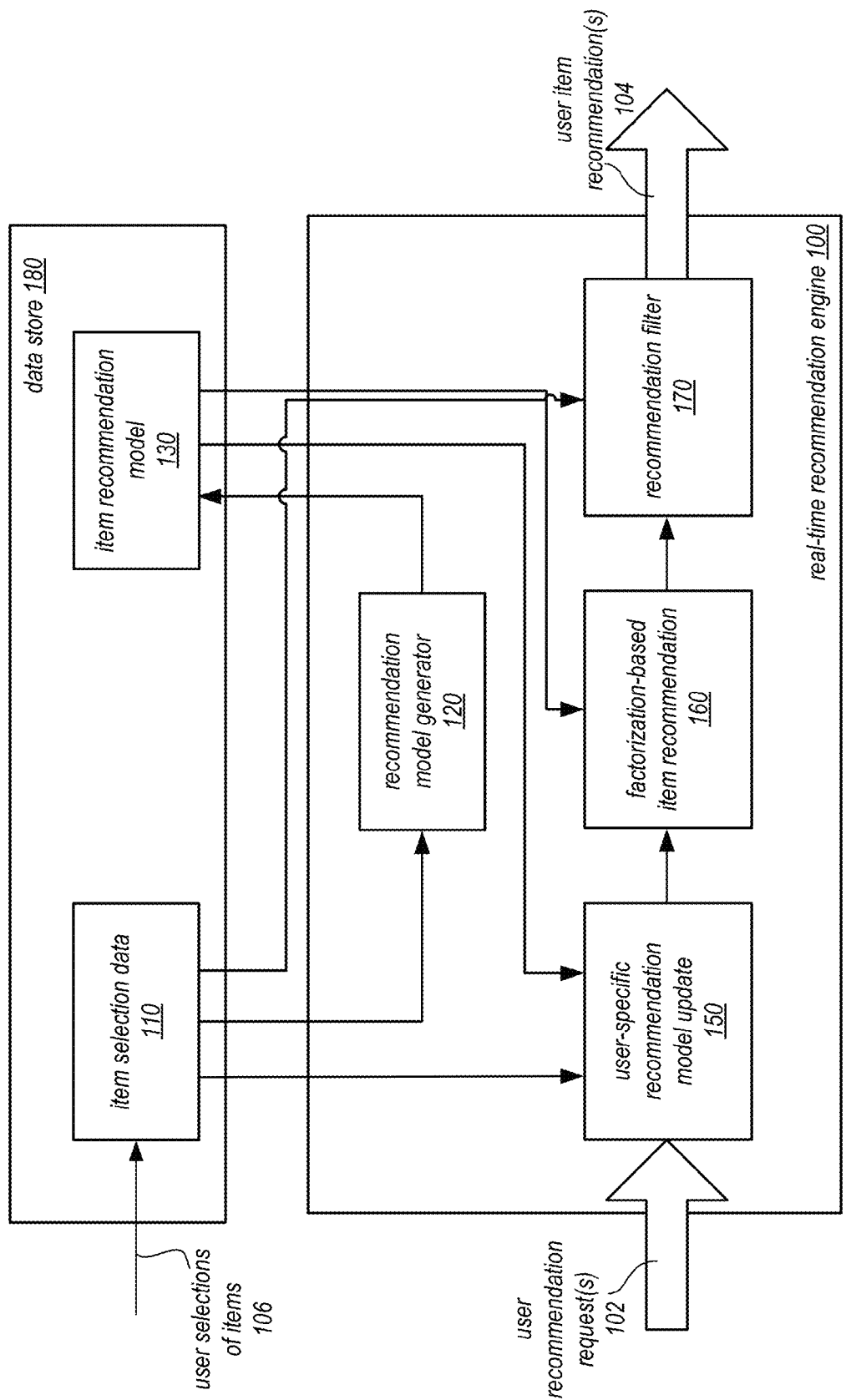
FIG. 1 is a block diagram illustrating a real-time item recommendation engine implementing real-time updates to an item recommendation model based on matrix factorization, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a computer system may be configured to perform operations even when the operations are not currently being performed). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. §112, paragraph six, interpretation for that component.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION

Various embodiments of real-time updates to item recommendation models based on matrix factorization are described herein. Item recommendation models typically contain large data sets describing the actions of many users with respect to various items. In order to efficiently analyze the large amounts of data collected and retained for the purpose of generating item recommendation models matrix factorization techniques may be implemented. Singular value decomposition, for example, takes data representing item selections by users in a single large matrix and generates corresponding matrices for the users and the items, which may then be used to make item recommendations as the item recommendation model. However, techniques such as singular value decomposition are often performed as a batch process, working upon all existing data for items selections as of a current time. This technique may not be performed efficiently for providing item recommendations for particular users in real-time. Real-time updates to item recommendation models, however, may be implemented that provide item recommendations with similar results to performing an update of the entire item recommendation model.

FIG. 1 is a block diagram illustrating a real-time item recommendation engine implementing real-time updates to an item recommendation model based on matrix factorization, according to some embodiments. Real-time recommendation engine 100 may be configured to provide item recommendations for particular users in real-time, without having to generate an update to an entire item data model. In various embodiments, items may be any digital product or media, physical product, service, or other object physical or virtual for which a selection action may be performed. Persistent data store 180 (e.g., persistent block-based storage devices such as hard disk drives or solid state drives) may store item selection data 110 and an item recommendation model 130. As selections of items are made by users, these selections 106 may be stored in item selection data 110. Periodically (or aperiodically) item recommendation model 130 may be generated from item selection data. Recommendation model generator 120 (which may be implemented as part of real-time item recommendation engine 100) may receive as input the item selection data 110 up to a certain point in time. The data may be formatted as a single matrix indicating the selection of items by particular users. Recommendation model generator may perform a singular value decomposition (as described in detail below with regard to FIG. 2A) to generate the item recommendation model 130, which may be associated with a particular point in time. This may result in a user matrix storing user parameter vectors for users and an item matrix storing item parameter vectors for items.

As user recommendation requests are received for particular users 102, user-specific recommendation update module 150 may be configured to obtain information about a particular user's item selections. Those item selections that occurred after the particular point in time in which the item recommendation model 130 was generated may be identified. User-specific recommendation update module 150 may also be configured to access the item recommendation model 130 to obtain a user parameter vector for the particular user and item parameter vectors for those items that were subsequently selected by the user. In some embodiments, other user parameter vectors and/or item parameter vectors selected by other users linked to the particular user may be selected and used for determining a user-specific update for the item recommendation model for the particular user. The obtained parameter vectors may be combined using vector addition to generate an updated user parameter vector for the particular user. Further detail is described below with regard to FIGS. 5-7. This user-specific update may then be made available to factorization-based item recommendation module 160 to determine item recommendations for the particular user. For example, factorization based item recommendation module 160 may be configured to obtain other item parameter vectors from item recommendation model 130 in order to calculate affinity scores for the particular user based on the user-specific update (as described in more detail below with regard to FIG. 9).

In some embodiments, a recommendation filter module 170 may be configured to select particular items to recommend based on selection criteria. For example, filter module 170 may obtain past item selections from item selection data 110 for the particular user in order to prevent previously selected items by the particular user from being recommended to the particular user. User item recommendations may then be provided 104 to the particular user, for example via a network-based interface.

Please note, FIG. 1 is provided as a logical illustration of real-time updates to item recommendation models based on matrix factorization, and are not intended to be limiting as to the physical arrangement, size, or number of components, modules, or devices, implementing a real-time recommendation engine or data store. For example, in some embodiments, the item recommendation model 130 and item selection data 110 may be stored separately. In another example, the module for generating the item recommendation module may be implemented separately from the real-time item recommendation engine.

Figure 2A:
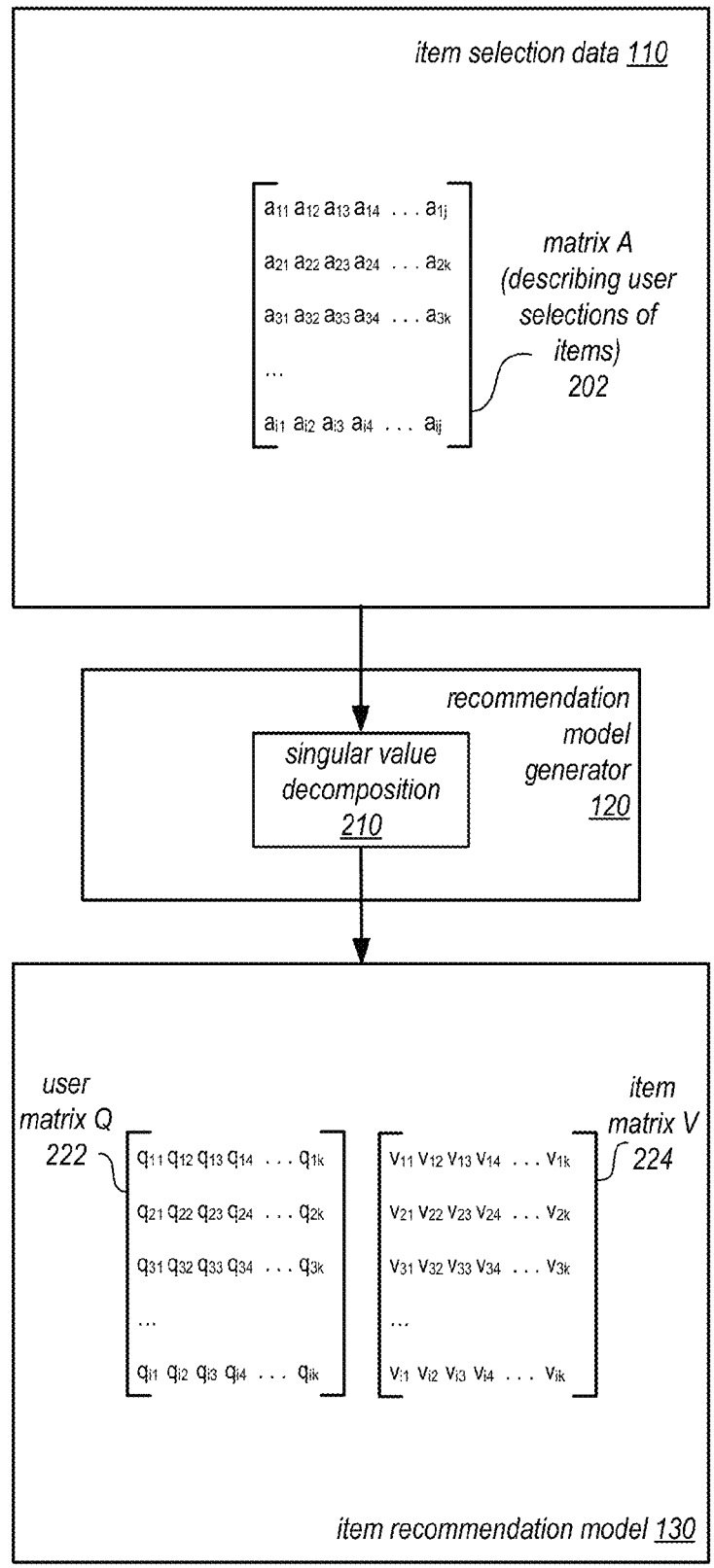
FIG. 2A is a block diagram illustrating an item recommendation model based on matrix factorization, according to some embodiments.

FIG. 2A is a block diagram illustrating an item recommendation model based on matrix factorization, according to some embodiments. Item selection data 110 may maintain, in various embodiments, a single matrix describing user selections with regard to items, matrix A 202. This item selection matrix may be represented as $A \in \{0,1\}$ m× n where m is the number of users and n is the number of items. $A_{ij}=1$ if user i selected item j. Recommendation model generator 120 may implement a component 210 configured to perform a singular value decomposition on item selection data, matrix A 202 in order to generate the item recommendation model. For example, $A=U\Sigma V^T$ may be the thin singular value decomposition (SVD) of A where d is the latent dimensionality. The shapes of the matrices may be U, Σ, V are $U \in \mathbb{R}^{m \times d}$, $V \in \mathbb{R}^{n \times d}$, and $\Sigma \in \mathbb{R}_+^{d \times d}$ diagonal. The columns of U and V are orthogonal and have unit norm. Therefore, $Q=U\Sigma$ may be user matrix Q 222, whose i'th row may be the parameter vector for the i'th user. The diagonal matrix Σ scales the columns of U by the corresponding diagonal element $Q_{ij}=U_{ij}\Sigma_{jj}$. Item matrix V 224 may be the matrix of video parameters whose j'th row is the parameter vector for item j. Thus, an affinity estimate of a user i's affinity for item j may be $\Sigma_k Q_{ik} V_{jk}$.

From an SVD decomposition of the single matrix A, 202, and as V is orthogonal, it may be that Q=AV. Moreover, as A is a binary matrix, the i'th row of Q is the just sum of the rows $V_j$ for which $A_{ij}=1$:

$$Q_j = \Sigma_{j=1}^d A_{ij} V_j = \Sigma_{j:A_{ij}=1} V_j.$$

In other words, the parameter vector for a user may be the sum of the parameter vectors for the items selected. Therefore, a user-specific update may be calculated for user selections up to time t, so that $Q_t += V_j$, for all items selected since time t. In this way, the SVD calculation to generate the item recommendation model may be updated for a specific user without having to perform SVD. This may allow for longer intervals between generating an updated item recommendation model 130.

Figure 2B:
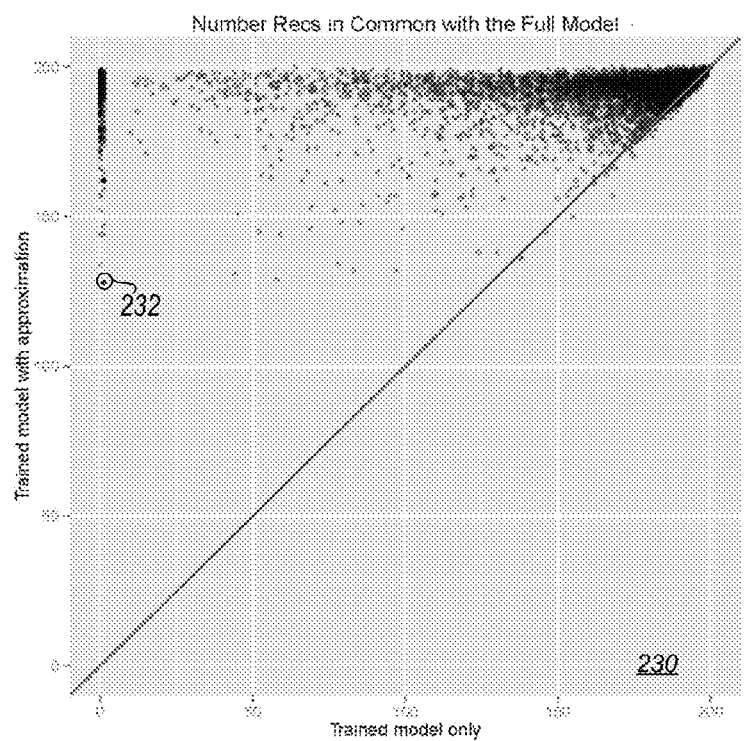
FIG. 2B is a scatter plot diagram comparing common item recommendations between a real-time update for an item recommendation model for users and an item recommendation model that is not updated in real-time for the same users, according to some embodiments.

While user-specific updates may not account for all changes that generating an updated item recommendation model may include, user-specific updates may produce similar results. FIG. 2B is a scatter plot diagram comparing common item recommendations between a real-time update for an item recommendation model for users and an item recommendation model that is not updated in real-time for the same users, according to some embodiments. Scatter chart 230 illustrates on the x-axis an older version of the item recommendation model. The y-axis represents recommendations using user-specific updates and the older item recommendation model. 200 test recommendations were made to compare the results of the two techniques with a "perfect" model that includes all item selections. Each point represents recommendations for a particular user. For example, point 232 represents that the older version of the model had 0 recommendations in common with the "perfect" model, while the older version plus the user-specific updates had approximately 125 recommendations in common with the "perfect" model.

Figure 2C:
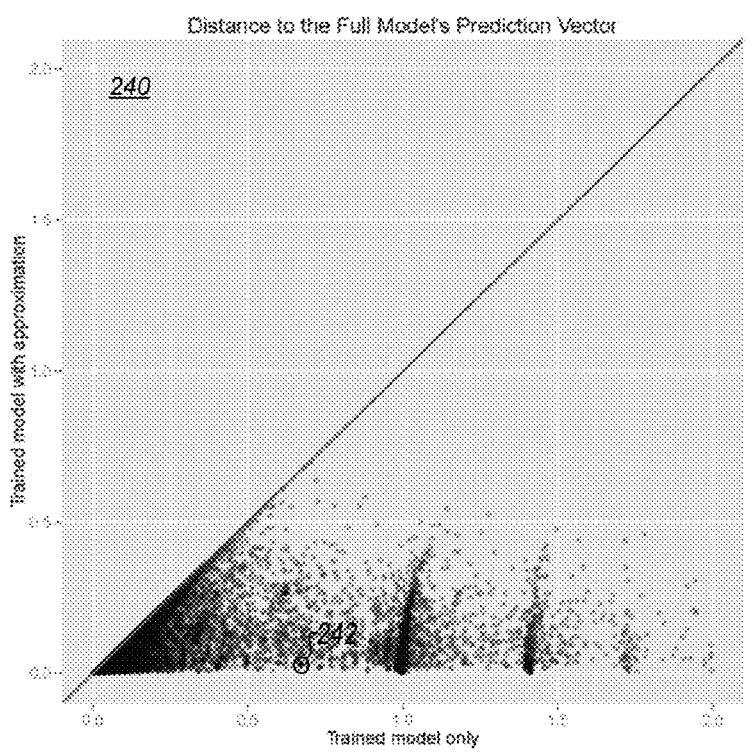
FIG. 2C is a scatter plot diagram comparing user parameter vector differences between a real-time update for an item recommendation model for users and an item recommendation model that is not updated in real-time for the same users, according to some embodiments.

FIG. 2C is a scatter plot diagram comparing user parameter vector differences between a real-time update for an item recommendation model for users and an item recommendation model that is not updated in real-time for the same users, according to some embodiments. Again, scatter chart 240 illustrates on the x-axis an older version of the item recommendation model. The y-axis represents recommendations using user-specific updates and the older item recommendation model. 200 test recommendations were made to compare the results of the two techniques with a "perfect" model that includes all item selections. Each point represents distance between the "perfect" model's user parameter vectors with the parameter vector for a particular user using the older version of the item recommendation model alone and the older item recommendation model including user-specific updates. Point 242 illustrates that the user-specific update parameter has almost no distance from the "perfect" model (thus being very similar) than the older model without user updates, showing a distance of near 0.7.

Figure 3A:
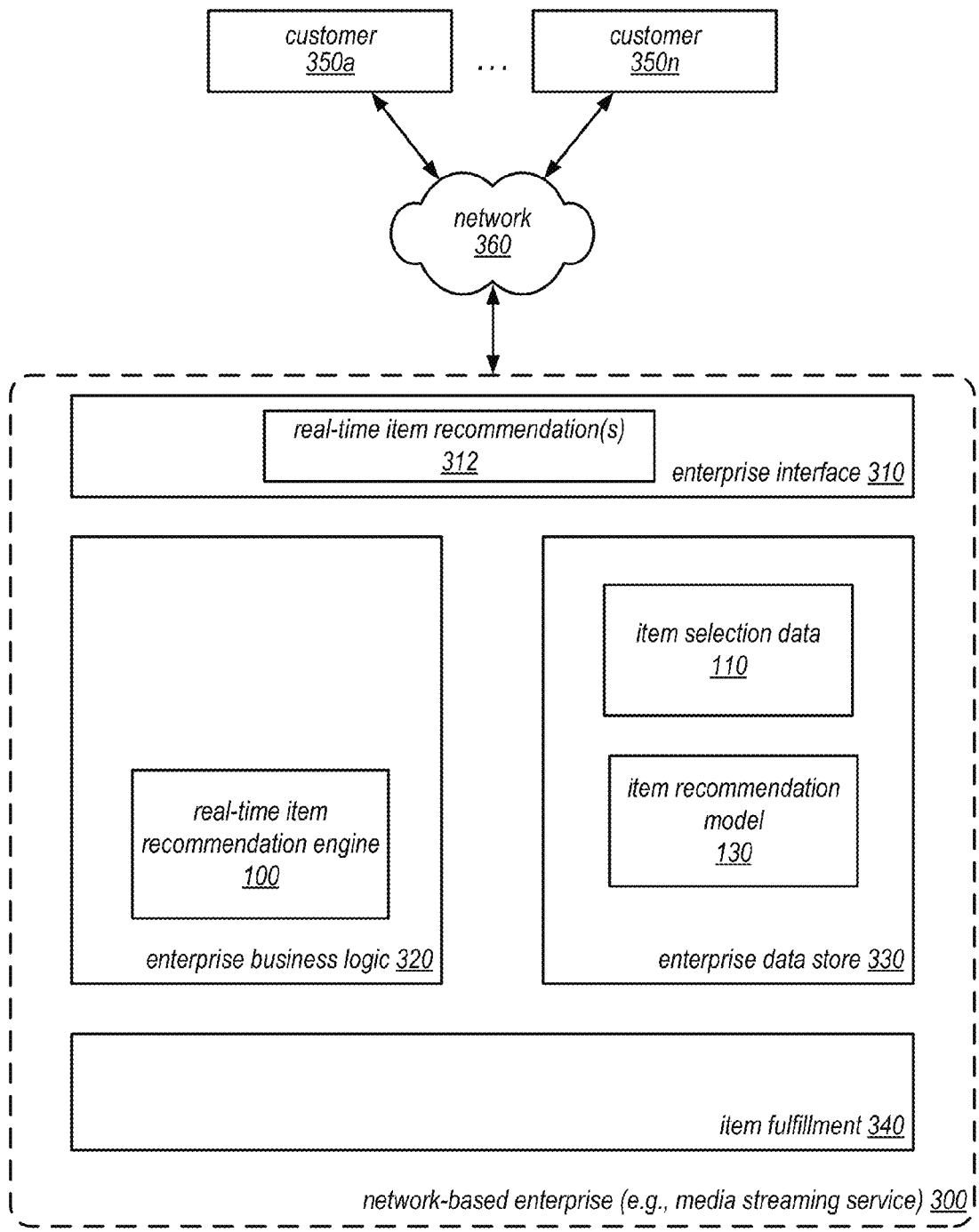
FIG. 3A is a block diagram illustrating a network-based enterprise implementing real-time updates to an item recommendation model based on matrix factorization, according to some embodiments.

The systems described herein may, in some embodiments, implement a network-based enterprise that offers items to customers (which may be users). The items may be used, purchased, rented, or otherwise consumed. Selection of an item may correspond to one of these actions and/or rating or reviewing a particular item. Some embodiments of a network-based enterprise system are illustrated in FIG. 3A. In the illustrated embodiment, a number of clients (shown as customers 350a-350n) may be configured to interact with a network-based enterprise 300 via a network 360. An enterprise interface (e.g., a network-based site, such as a website) 310 may handle or communicate with customers 350. Enterprise business logic 320 may be configured to handle processing, management, and other techniques necessary to provide the request items to customers 350. Enterprise data store 330 may maintain information for the network-based enterprise 300. Item fulfillment 340 may be either the physical or digital resources (items) provided to customers 350 upon selection. It is noted that where one or more instances of a given component may exist, reference to that component herein may be made in either the singular or the plural. However, usage of either form is not intended to preclude the other.

In various embodiments, the components illustrated in FIG. 3A may be implemented directly within computer hardware, as instructions directly or indirectly executable by computer hardware (e.g., a microprocessor or computer system), or using a combination of these techniques. For example, the components of FIG. 3A may be implemented by a system that includes a number of computing nodes (or simply, nodes), each of which may be similar to the computer system embodiment illustrated in FIG. 10 and described below. In various embodiments, the functionality of a given system component (e.g., real-time item recommendation engine 100) may be implemented by a particular node or may be distributed across several nodes. In some embodiments, a given node may implement the functionality of more than one system component (e.g., more than enterprise business logic 320 component).

Generally speaking, customers 350 may encompass any type of client or other component configurable to submit network-based requests to network-based enterprise 300 via network 360, including requests to select particular items offered. For example, a given customer 350 may include a suitable version of a web browser, or may include a plug-in module or other type of code module configured to execute as an extension to or within an execution environment provided by a web browser. For example, selection of physical products for purchase, submitting payment information and shipping information may be conveyed via the web browser. Alternatively, a customer 350 (e.g., a gaming client) may encompass an application such as a gaming application (or user interface thereof), a media application, an office application or any other application that may make use of persistent storage resources to store and/or access digital items. In some embodiments, such an application may include sufficient protocol support (e.g., for a suitable version of Hypertext Transfer Protocol (HTTP)) for generating and processing network-based requests without necessarily implementing full browser support for all types of network-based data. That is, customer 350 may be an application configured to interact directly with network-based enterprise 300 (or enterprise interface 310). In some embodiments, customer 350 may be configured to generate network-based requests according to a Representational State Transfer (REST)-style network-based architecture, a document- or message-based network-based architecture, or another suitable network-based architecture.

Customers 350 may convey network-based requests (e.g., item selection requests) to and receive responses from network-based enterprise 300 via network 360. In various embodiments, network 360 may encompass any suitable combination of networking hardware and protocols necessary to establish network-based-based communications between customer 350 and network-based enterprise 300 (and/or enterprise interface 310). For example, network 360 may generally encompass the various telecommunications networks and service providers that collectively implement the Internet. Network 360 may also include private networks such as local area networks (LANs) or wide area networks (WANs) as well as public or private wireless networks. For example, both a given customer 350 and network-based enterprise 300 may be respectively provisioned within enterprises having their own internal networks. In such an embodiment, network 360 may include the hardware (e.g., modems, routers, switches, load balancers, proxy servers, etc.) and software (e.g., protocol stacks, accounting software, firewall/security software, etc.) necessary to establish a networking link between given customer 350 and the Internet as well as between the Internet and network-based enterprise 300. It is noted that in some embodiments, customer 350 may communicate with network-based enterprise 300 using a private network rather than the public Internet. For example, customer 350 may via a private network as part of selecting and receiving digital items offered by network-based enterprise 300. In such a case, customers 350 may communicate with enterprise 300 entirely through a private network 360 (e.g., a LAN or WAN that may use Internet-based communication protocols but which is not publicly accessible).

Generally speaking, network-based enterprise 300 may be configured to implement enterprise interface 310 which may be configured to receive and process network-based requests, such as requests to select, browse, access, or otherwise interact with items offered. For example, enterprise interface 310 may include hardware and/or software configured to implement a network-based site, such that a web browser or other component implemented on customer 350 may be configured to receive information via the network-based site. For example, in some embodiments, real-time item recommendations 312 may be provided to different customers 350 (e.g., based on a user associated with the customer, such as by a user or customer identifier or account number) via the network-based site. Enterprise interface 310 may be implemented as a server system configured to receive network-based requests from customers 350 and to forward them to components of a system, such as enterprise business logic 320, that facilitate the offering, sale, distribution or other functionalities of the items offered by network-based enterprise 300. In other embodiments, enterprise interface 310 may be configured as a number of distinct systems (e.g., in a cluster topology) implementing load balancing and other request management features configured to dynamically manage large-scale network-based request processing loads. In various embodiments, enterprise interface 310 may be configured to support REST-style or document-based (e.g., SOAP-based) types of network-based requests.

Enterprise business logic 320 may be configured to facilitate the operations of network-based enterprise 300. For example, enterprise business logic 320 may coordinate the purchase, rental, access, sharing, metering and/or accounting of client usage/selection of items, which may be services, physical products, or digital media, in various embodiments. In at least some embodiments, network-based enterprise 300 may be a streaming video service. Enterprise business logic 320 may implement financial accounting and billing systems, or may maintain a database of usage data that may be queried and processed by external systems for reporting and billing of customer activity. In certain embodiments, enterprise business logic 320 may be configured to collect, monitor and/or aggregate a variety of operational metrics, such as metrics reflecting the rates and types of requests received from customers 350, bandwidth utilized by such requests, system processing latency for such requests, system component utilization (e.g., network bandwidth and/or storage utilization within the storage service system), rates and types of errors resulting from requests or any other suitable metrics. In some embodiments such metrics may be used by system administrators to tune and maintain system components, while in other embodiments such metrics (or relevant portions of such metrics) may be exposed to customers 350 to enable such customers to monitor their usage of services/items. Enterprise business logic may also implement various user and/or customer account functions which may be responsible for updating or maintaining customer/user account information. User information, such as a unique user identifier, may be linked to item selection data 110 for customers/users maintained in enterprise data store 330.

In some embodiments, enterprise business logic 320 may also implement user authentication and access control procedures. For example, for a given network-based request to access a particular item, enterprise business logic 320 may be configured to ascertain whether the customer 350 associated with the request is authorized to access the particular item. Enterprise business logic 320 may determine such authorization by, for example, evaluating an identity, password or other credential against credentials associated with the particular item, or evaluating the requested access to the particular item against an access control list for the particular item. Various access control policies may be stored as records or lists of access control information by enterprise business logic 320. In some embodiments, these access control policies may be implemented to accept or deny access to multiple items offered by network-based enterprise 300 (e.g., some or all of streaming videos).

Enterprise data store 330 may be one or more storage nodes, systems, or servers configured to persistently store data for enterprise data store, such as the aforementioned user information, item selection data 110 and/or item recommendation model 130. Various durability and/or security techniques may be implemented to ensure safe and reliable storage of sensitive information, such as payment information, accounts, or passwords.

Item fulfillment 340 may be one or more systems or devices configured to provide selected items to customers 350 that are offered by network-based enterprise 300. For example, item fulfillment 340 may be a network of one or more fulfillment centers that stock physical products and process shipment orders of those products selected by customers 350. In some embodiments, item fulfillment 349 may be application servers, content distribution networks, application, gaming or other media platforms that provide access to or a copy of digital media selected by customers 350. For example, movies, television shows, or other audio/visual media may be streamed or downloaded to customers 350 for consumption as part of a network-based video streaming or gaming service. If access to or rights to an item is limited, item fulfillment 340 may be configured to enforce digital rights management (DRM) or other controls to enforce the policies of the items and their respective offers (e.g., rental or borrow of digital media for certain time periods).

As illustrated in FIG. 3A, real-time recommendation engine 100 may be implemented in enterprise business logic 320 in order to provide item recommendations for customers 350. For example, a particular customer 350 may be communicating with the enterprise interface, perhaps making a selection of a particular item. Real-time product recommendation engine may receive a request from another component of business logic 320 or enterprise interface 310 to provide real-time item recommendations for the particular user that selected the particular item. Item selection data 110 may be accessed to identify subsequent item selections after the generation of item recommendation model 130. A user-specific update for the user may be calculated based on a user parameter vector obtained from item recommendation model 130 as well as item parameter vectors for the subsequently selected items. Item recommendations may then be determined, according to the various techniques described in FIGS. 5-8 below, in order to provide the determined item recommendations 312 for the particular user.

Figure 3B:
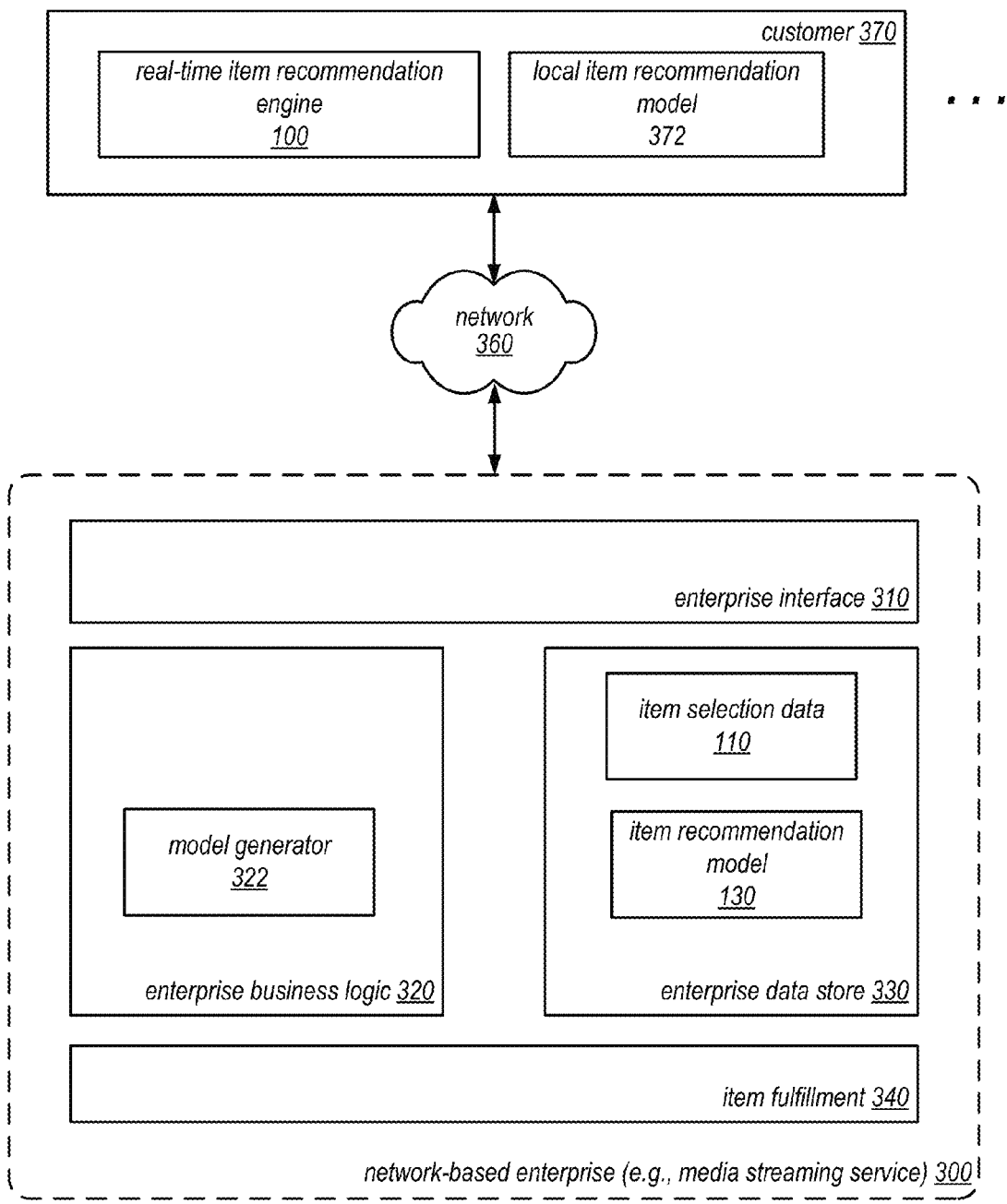
FIG. 3B is a block diagram illustrating a customer device implementing real-time updates to an item recommendation model based on matrix factorization, according to some embodiments.

FIG. 3B is a block diagram illustrating a customer device implementing real-time updates to an item recommendation model based on matrix factorization, according to some embodiments. Instead of implementing real-time item recommendation engine 100 as part of the network-based enterprise 300 (as described above with regard to FIG. 3A), customer device 370 may implement real-time recommendation engine 100, in various embodiments. Item recommendations may be made similar to the techniques described above. Local item recommendation model 372 may be a recommendation model that is received from network-based service 300, which may implement a model generator 322 to provide update versions of the item recommendation model including selections up to a particular point in time. Real-time recommendation engine 100 may provide real-time item recommendations accessing user parameter vectors and item vectors maintained in local item recommendation model 372. In at least some embodiments, real-time item recommendations engine 100 may access other actions taken at customer device 370. For example, customer device 370 may be a streaming media device that is configured to access or select media offerings from multiple different network-based enterprises. Real-time item recommendations engine may be configured to track other selections of items offered by these other network-based services and map them to particular items offered by network-based enterprise 300. If, for instance, movie A is selected from another network-based enterprise and watched at customer device 370, the real-time item recommendation engine 100 may be configured to map the selection of movie A to (either movie A offered via network-based enterprise 300 or a similar movie) and include the corresponding item parameter vector for movie A in calculating user-specific updates.

Figure 4:
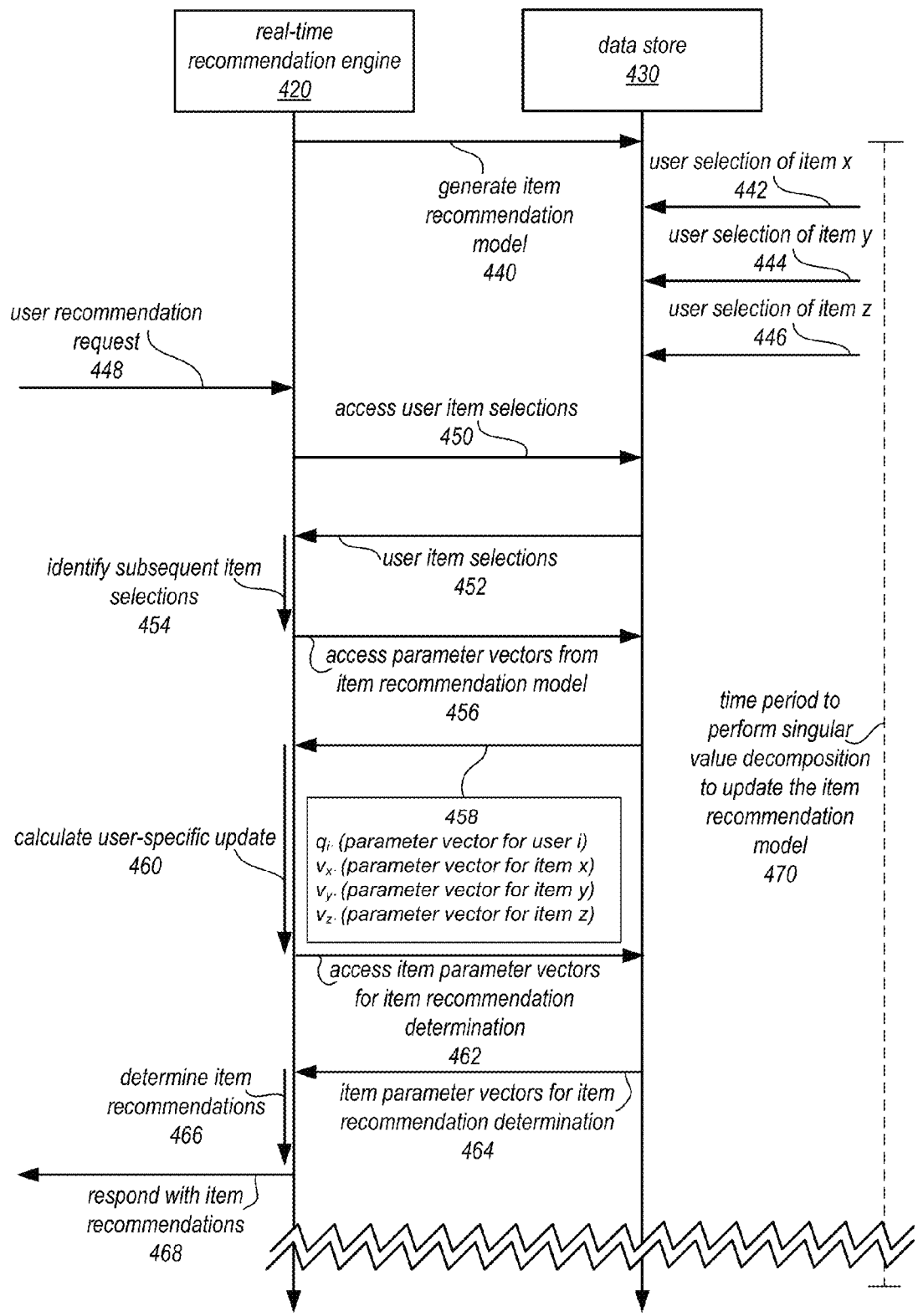
FIG. 4 is a sequence diagram illustrating determining item recommendations for a particular user based on a real-time update to an item recommendation model in response to an item recommendation request for the particular user, according to some embodiments.

FIG. 4 is a sequence diagram illustrating determining item recommendations for a particular user based on a real-time update to an item recommendation model in response to an item recommendation request for the particular user, according to some embodiments. Real-time recommendation engine 420 may provide item recommendations for a particular user in real-time, by determining user-specific updates to an item recommendation model. Data store 430 may store data such as the item recommendation model (e.g., item recommendation model 130 and item selection data 110 discussed above). Real-time recommendation engine 420 (or other responsible component) may generate a new version of the item recommendation model 440 at data store 430 at a particular point in time.

Item selections may be made users subsequent to the generation or update to the item recommendation model 440. For example, a particular user may make user selections 442, 444, and 446 of items x, y and z after the generation of item recommendation model 440. Indications of these item selections may be stored in item selection data in data store 430. When item recommendation request 448 is received at real-time recommendation engine 420 for the particular user these subsequent item selections may be accounted for. For example real-time recommendation engine 450 may access user item selections 450 for the particular user, to obtain the user item selections 452. Real-time recommendation engine 420 may then identify 454 those user selections that occurred after the generation of the item recommendation model 440 (e.g., by comparing timestamps of the user selections). Thus, user selections of items x, y and z (442, 444 and 446) may be identified.

Real-time recommendation engine 420 may then access data store 430 to obtain parameter vectors from the item recommendation model 456. Parameter vectors for the particular user (user i) and the particular items (x, y and z) may be returned 458. The user-specific update may then be calculated 460, such as by performing vector addition to combine the user parameter vector $q_i$ with the item parameter vectors $v_x$, $v_y$ and $v_z$. Real-time recommendation engine 420 may then access data store 430 to obtain other item parameter vectors for determining item recommendations 462. Real-time recommendation engine 420 may then make item recommendation determinations 466. For instance, affinity scores may be determined for the particular user and various items by performing a dot product calculation between the user-specific update and a respective item parameter vector. Then, real-time recommendation engine 420 may respond with the item recommendations 468.

As discussed above, the user-specific update to the item recommendation model may be performed in real-time, without resorting to performing another singular value decomposition to update the entire item recommendation model. The dotted line 470 illustrates visually a timespan for which a singular value decomposition to update the item recommendation model may be performed. Note the break in the time, indicating the additional time not illustrated that may be required to perform a complete update to the item recommendation model. Thus, user-specific updates useful for providing real-time item recommendations may be made in significantly less time than an update to the entire item recommendation model.

Figure 5:
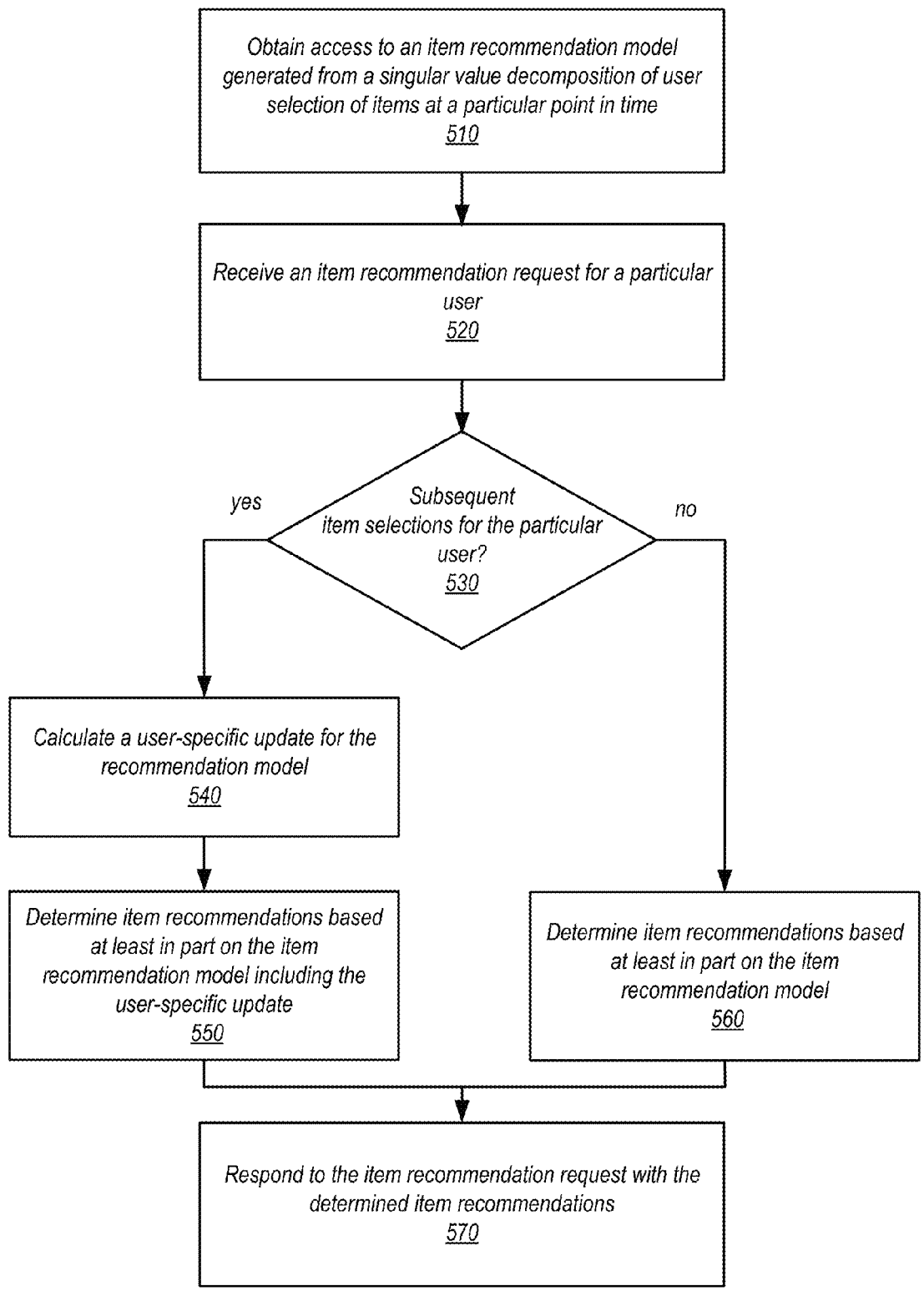
FIG. 5 is a high-level flowchart illustrating methods and techniques for implementing real-time updates to an item recommendation model based on matrix factorization, according to some embodiments.

The various embodiments of a network-based enterprise implementing real-time updates to item recommendation models based on matrix factorization described with regard to FIGS. 2-4 above, may implement one or more different techniques described below with regard to FIGS. 5-8. However, various other kinds of item recommendation systems may implement real-time updates to item recommendation models based on matrix factorization. FIG. 5 is a high-level flowchart illustrating methods and techniques for implementing real-time updates to an item recommendation model based on matrix factorization, according to some embodiments. Different combinations of systems and/or devices may implement the various techniques discussed below.

As indicated at 510, access to an item recommendation model generated from a singular value decomposition of a single matrix indicating user selection of items at a particular point in time may be obtained, in various embodiments. The item recommendation model may include a user matrix, of which particular rows in the user matrix represent particular users. The item recommendation model may also include an item matrix, of which particular rows in the item matrix may represent particular items. The item recommendation model may be maintained persistently, in various embodiments.

In at least some embodiments, an item recommendation request for a particular user may be received, as indicated at 520. For instance, a network-based interface or other component or module may desire to provide item recommendations to a particular user and send a request to a system component, such as real-time item recommendation engine 100 described above with regard to FIG. 1, to provide item recommendations. Please note, however, that in some embodiments user-specific updates such as described below with regard to element 540 may be updated for users at other times (e.g., when an indication of item selection is received that is subsequent to the generation of the item recommendation model) and need not be performed in response to a recommendation request.

Figure 6:
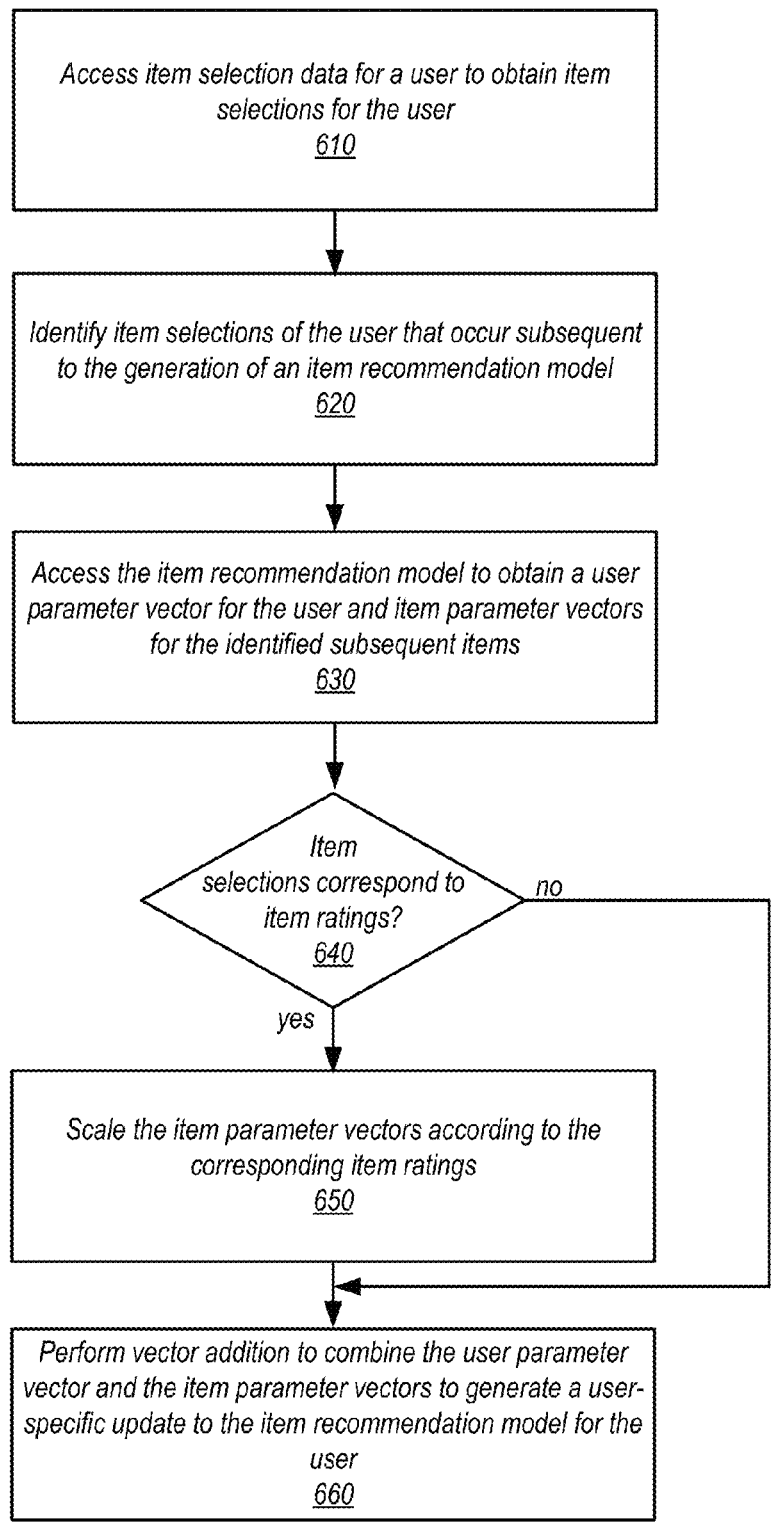
FIG. 6 is a high-level flowchart illustrating methods and techniques for calculating a user-specific update for an item recommendation model for a particular user, according to some embodiments.

As indicated by the positive exit from 530, if item selections by the particular user are subsequent to the generation of the item recommendation module, then a user-specific update for the recommendation model may be calculated as indicate at 540. In various embodiments, a current user parameter vector for the particular user may be obtained from the item recommendation model, and item parameter vectors for the subsequently selected items may also be obtained may be used to calculate the user-specific update to the item recommendation model. In various embodiments, the user-specific update to the item recommendation module may not update other user parameter vectors or item parameter vectors stored in the item recommendation model. In at least some embodiments, the user-specific update to the item recommendation model may be calculated in real time, such that another singular value decomposition to update the item recommendation model is not performed (or cannot be performed prior to calculating the user-specific update). FIG. 6, discussed below, provides further detail for calculating the user-specific update to the item recommendation model.

Figure 9:
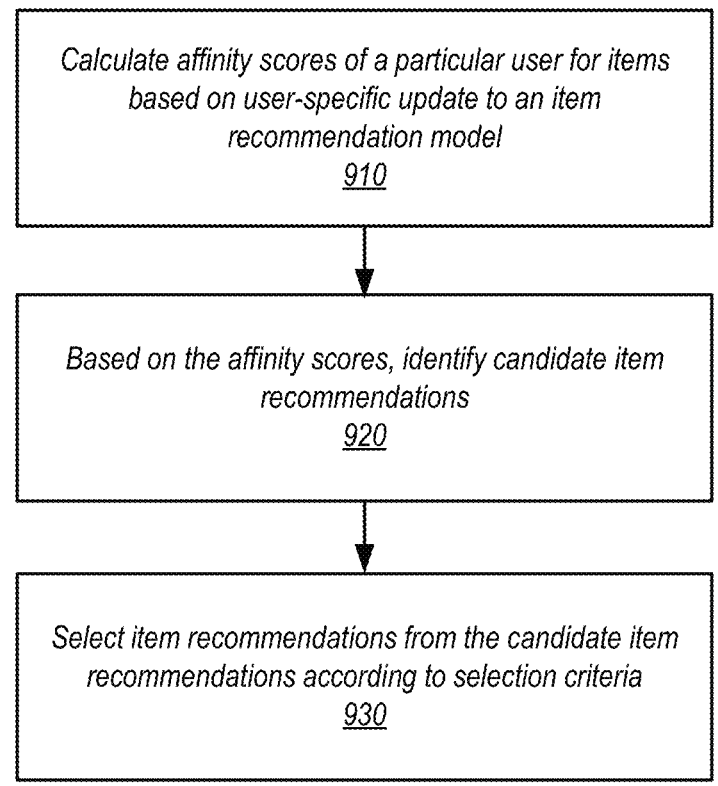
FIG. 9 is a high-level flowchart illustrating methods and techniques for determining one or more item recommendations based on an item recommendation model generated from matrix factorization, according to some embodiments.

One or more item recommendations may then be determined based, at least in part, on the item recommendation model, including the user-specific update, as indicated at 550. For example, the user-specific update may be an updated user parameter vector which may be used to determine different affinity scores between the particular user and other items. Item recommendations may then be made based on the determined affinity scores for the particular user. FIG. 9 provides further detail and discussion of determining item recommendations below. Item recommendations may also be determined for a particular user based on the item recommendation model without including a user specific update, as indicated at 560. If, as indicated by the negative exit from 530, no subsequent item selections by the particular user have occurred, then a user-specific update may not necessary to make item recommendations for the particular user. Once item recommendations have been made, a response to the request for item recommendations may be made with the determined item recommendations, as indicated at 570. These item recommendations may be directly communicated to a particular user or received, formatted, and/or re-communicated via an intermediary component, such as a network-based interface.

Updates to the entire item recommendation model may occur periodically or aperiodically, in some embodiments. For example, every 24 hours, singular value matrix decomposition may be performed on the matrix describing current user item selections to generate an updated user matrix and item matrix. Thus, in various embodiments, user-specific updates to the item recommendation model may be overwritten, removed, or made obsolete upon the performance of another singular decomposition to update the item recommendation model. However, updates to the item recommendation model may be performed less frequently for systems implementing real-time updates to the item recommendation model, as discussed above with regard to FIGS. 2B and 2C, as user-specific updates may provide good approximations of complete updates to the item recommendation model.

FIG. 6 is a high-level flowchart illustrating methods and techniques for calculating a user-specific update for an item recommendation model for a particular user, according to some embodiments. As indicated at 610, item selection data for a user may be accessed to obtain item selections for the user, in some embodiments. Item selection data may be maintained in a persistent data store or other storage area. The item selections obtained may be some or all of the item selections for the user (e.g., all item selections within the last 6 months). Item selections of the user that occur subsequent to the generation of an item recommendation model may be identified, as indicated at 620. For example, the item recommendation model used for generating item recommendations may be generated at specific point in time. The item selections may themselves be associated with particular points in time (e.g., times at which an indication of the item selection is received). A timestamp or other indication may, in various embodiments, indicate the particular point in time associated with a particular item selection. The times of each of the item selections may then be compared to the time the item recommendation model was generated and those item selections that occur later (i.e., more recently or subsequent to) than the item recommendation model generation time may be identified as subsequent item selections of the particular user.

As indicated at 630, the item recommendation model may then be accessed to obtain a user parameter vector for the user and item parameter vectors for the identified subsequent items, in various embodiments. The user parameter vector may be the row of values in the user matrix corresponding user number or identifier in the single matrix from which the item recommendation model is generated (as discussed above with regard to FIG. 2A). Similarly, item parameter vectors may be the rows of values in the item matrix corresponding to the item number or identifier in the single matrix from which the item recommendation model is generated.

In some embodiments, item selections in the single matrix which indicates selections of items between users and items may correspond to a particular rating value out of multiple rating values implementing a rating scheme. For instance, a rating value may be 1, 2, 3, 4, or 5 stars, or a 4.0 scale, or any other rating scheme or scale for which different rating values may be determined. As indicated by the positive exit from 640, if the item selections correspond to a rating scale, then the item parameter vector may be scaled according to the corresponding item ratings, as indicated at 650. For example, in some embodiments, the rating may correspond to particular number or value which may multiplied with respect to the item parameter vector. If the item selections do not correspond to item ratings, as indicated by the negative exit from 640, then the item parameter vectors may not be scaled, in at least some embodiments.

As indicated at 660, vector addition may be performed to combine the user parameter vector and the item parameter vectors to generate a user-specific update to the item recommendation model for the user, in some embodiments. The user-specific update may be an updated user parameter vector which may be used or included in determining one or more item recommendations, as discussed below with regard to FIG. 9. In at least some embodiments, the user-specific update may be calculated in real-time, without (or faster than) performing another singular value decomposition to update the item recommendation model, as discussed above with regard to FIG. 4.

Figure 7:
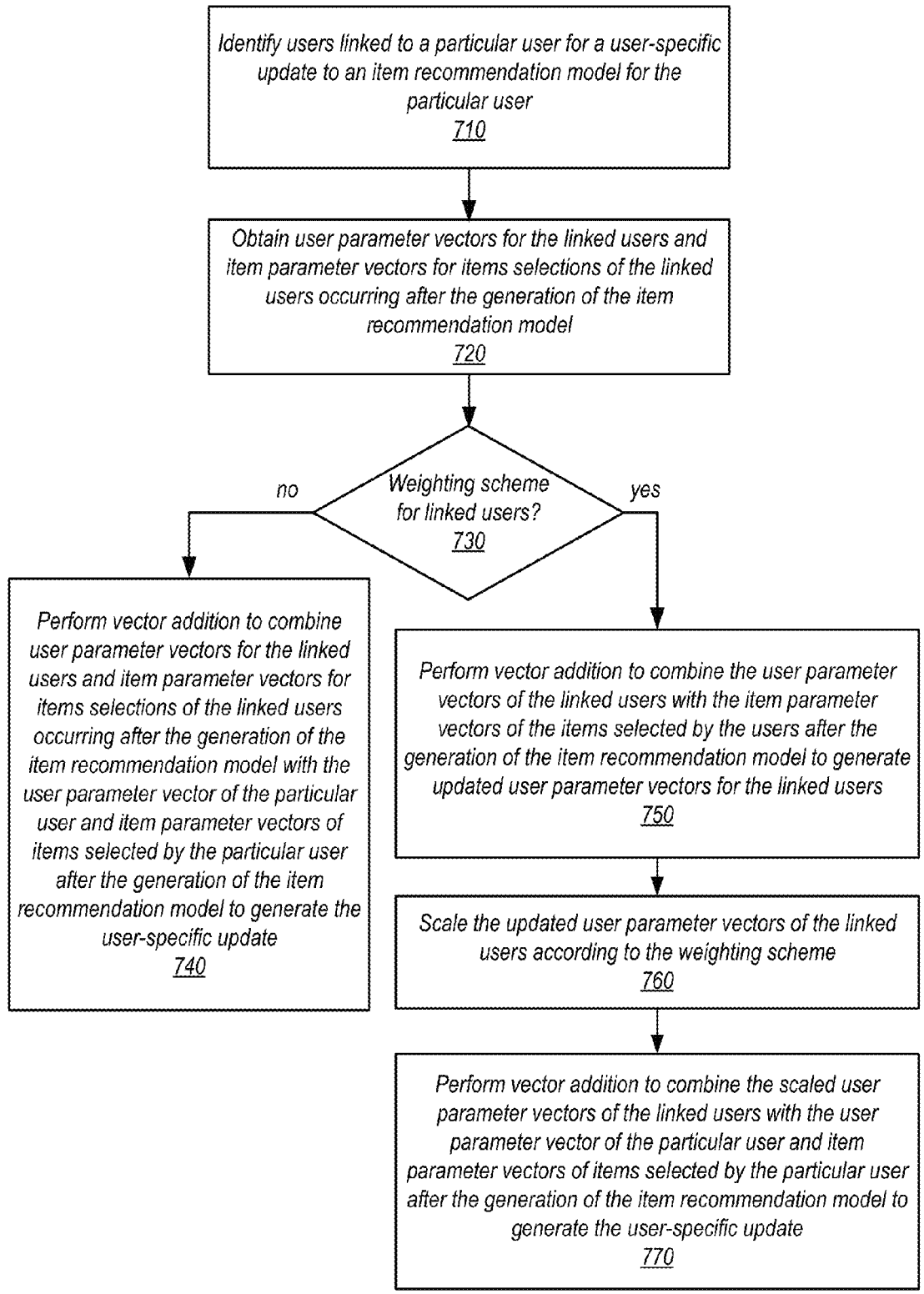
FIG. 7 is high-level flowchart illustrating methods and techniques for calculating a user-specific update for a particular user linked to other users, according to some embodiments.

Users may, in various embodiments, be associated or linked to other users. For example, multiple users may be registered under a common customer account, which may be useful to consolidate payment information, user logistic information (e.g., shipping address, digital or computing devices configured to receive items, etc.), or other information involving the selection of items. Such commonalties may be useful when determining item recommendations for a particular user by accounting for the affinities of other users in the customer account. Other links or associations between users may also be implemented or determined. For example, users may establish relationships (e.g., two users may play together/against one another in a gaming application or multiple users may send various communications to one another via a social media service). Users may belong to a particular voluntary grouping such as a particular item forum, fan group, hobby or common interest organization, club, or other association that may indicate common interests. In some embodiments, a user profile, such as may be a part of a customer account for a network-based enterprise, may allow for descriptive information about a particular user to be entered and/or stored, and may be used to identify other users that may be considered linked or associated with a particular user. Two user profiles may, for instance, include the same key words (e.g., "science fiction"). FIG. 7 is a high-level flowchart illustrating methods and techniques for calculating a user-specific update for a particular user linked to other users, according to some embodiments.

As indicated at 710, users may be identified as linked to a particular user for a user specific-update to an item recommendation model for the particular user, in various embodiments. In some embodiments, other users may be explicitly linked or associated with the user, and stored in mapping information or other metadata describing associations with the particular user. In some embodiments, other users may be intelligently selected based on common features with a particular user (e.g., prior interaction with the user, membership in user groupings, geographic or demographic similarities). The number of users that may be associated with a particular user may be limited, in some embodiments, so that selection or identification of linked users to the particular user may be determined according to various different priority schemes.

As indicated at 720, user parameter vectors for the linked users and item parameter vectors for items selected by the linked users occurring after the generation of the item recommendation model may be obtained. If a weighting scheme is applied for linked users, as indicated by the positive exit from 730, then vector addition may be performed for individual ones and/or each linked user to combine the user parameter vector for the linked user with item parameter vectors for which the user subsequently selected after the generation of the item recommendation model. For instance, if linked user A selected items bb and cc, and linked user B selected items dd and ee, then vector addition may be performed to combine the user parameter vector of A with the item parameter vectors for items bb and cc together. Likewise, the user parameter vector for linked user B may be combined with vector addition to item parameter vectors for items dd and ee.

As indicated at 760, individual ones of these updated parameter vectors for the linked users (e.g., the combined parameter vectors for user A and user B above) may be scaled according to the weighting scheme (e.g., multiplying the parameter vector by a particular scale value). For example, the weighting scheme may assign ranks, priorities, or other values to certain types of links to a particular user. For instance, if a linked user is a member of the same customer account as the particular user, then the weighted value of that linked user may be higher than a weighted value for a user that is only identified as linked to the particular user based on similar key words. Weighting factors may also be determined based on the type of items being considered for recommendation in some embodiments. When, for example, a linked user is identified by a similarity for a particular genre of music and the item recommendation is for music, then the linked user may be weighted higher than a linked user associated via common customer account (which may include users of a wide array of musical tastes).

After scaling the updated parameter vectors, vector addition may be performed to combine the scaled user parameter vectors of the linked users with a user parameter vector for the particular user and/or item parameter vectors of items subsequently selected by the particular user, as indicated at 770. Continuing the example above, the updated parameter vectors for user A and user B that are scaled above may be combined with a user vector U, as well as item parameter vectors ff and gg for subsequent item selections by user U of items ff and gg. This combined parameter vector may then be used as the user specific update.

Alternatively, as indicated by the negative exit from 730, the user parameter vector for the user and the users linked to the user may be combined together using vector addition along with item parameter vectors for items subsequently selected items by the user and/or linked users, as indicated at 740. Thus, the vectors may be combined without being scaled, in some embodiments.

Figure 8:
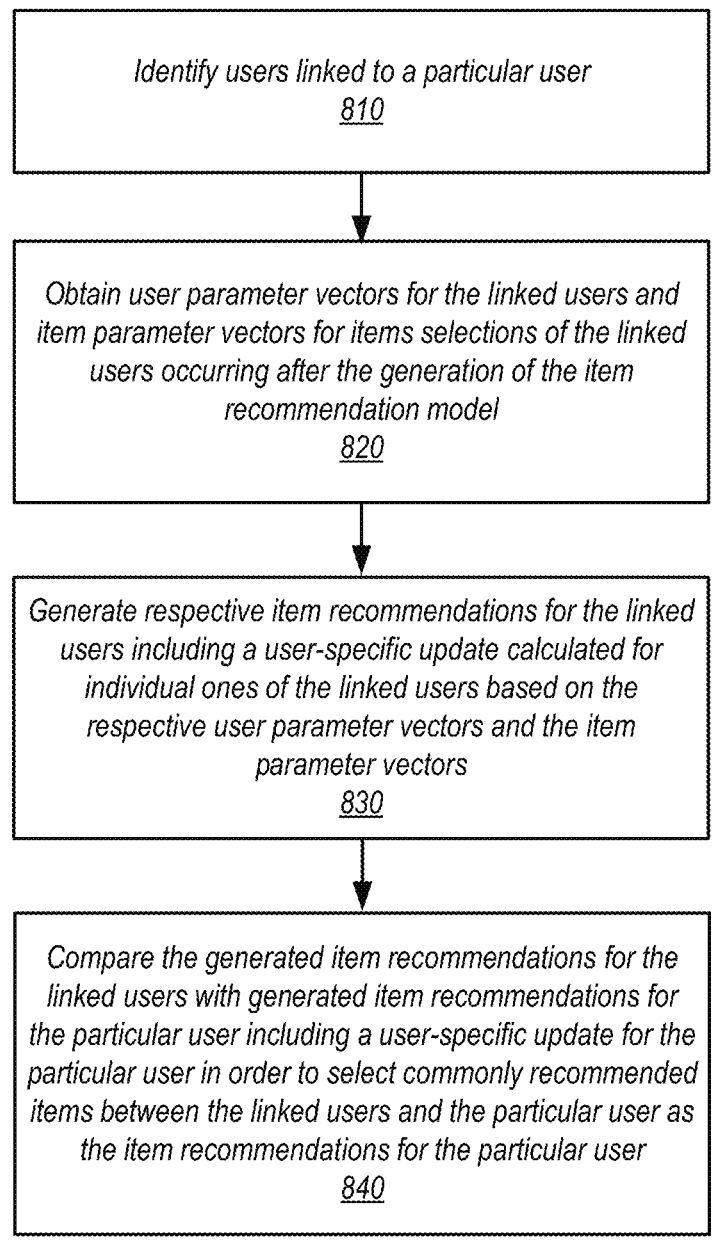
FIG. 8 is a high-level flowchart illustrating methods and techniques for comparing item recommendations among a particular user and other users linked to the particular user, according to some embodiments.

FIG. 8 is a high-level flowchart illustrating methods and techniques for comparing item recommendations among a user and other users linked to the user, according to some embodiments. As indicated at 810 users linked to a user may be identified. As noted above, various different associations, interactions, or commonalties with others who may be linked to user accounts can be evaluated to identify linked users. In at least some embodiments, social media associations (contacts or "friends" lists) may be used to identify linked users. As indicated at 820, user parameter vectors and item parameter vectors for the linked users may be obtained (for those linked users that have subsequently selected items since the item recommendation model was generated). Then, respective item recommendations may be generated for individual ones of the linked users based on user-specific updates calculated for the linked users from the respective user parameter vectors and item parameter vectors obtained, as indicated at 830. Please note that item recommendations may be generated for linked users that have not subsequently selected items after the generation of the item recommendation model. Item recommendations for these linked users may be generated using the respectively maintained user parameter vectors of these linked users. Once the different sets of item recommendations per user are generated, the item recommendations may be compared, as indicated at 840, in order to select commonly recommended items to provide as recommendations for the users. If, for instance, 3 out of 5 linked users had an item recommended for them, then the particular item may be provided as an item recommendation (even if it was not generated based on the user's model information alone). Various different schemes for weighting or indicating commonality between recommendations, and thus the previous example is not intended to be limiting.

As noted above, item recommendations for a particular user may be determined based on an item recommendation model generated from a singular value decomposition of a single matrix that represents item selections between users and items. A user-specific update for a particular user may be generated in real-time to be used for making item recommendations. FIG. 9 is a high-level flowchart illustrating methods and techniques for determining one or more item recommendations based on an item recommendation model generated from matrix factorization, according to some embodiments.

As indicated at 910, affinity scores may be calculated for a particular user for items based on a user specific update to an item recommendation model, in some embodiments. For example, an updated user parameter vector may be calculated as a user-specific update to the item recommendation model (as discussed above with regard to FIGS. 6 and 7). This user parameter vector may then be used to generate an affinity vis-à-vis a particular item. For instance, the dot product of user parameter vector $U_i$ with a particular item parameter vector $V_j$ may provide the affinity of user i for item j. Affinity scores may be generated for a subset or all of the items described in an item recommendation model. For example, a particular subset or type of item may be an electronic product, a particular genre of movie, book or music, and/or a category of application or service. In some embodiments, the higher an affinity score, the higher a user's affinity for the item may be.

Based, at least in part, on the affinity scores, candidate item recommendations may be identified, as indicated at 920. For instance, in some embodiments, the item affinity scores may be ranked, ordered, grouped, or otherwise arranged according to affinity score. One or more schemes may be applied to identify the candidate items, such as taking the highest scoring item in different particular groupings, or, for instance, identifying a certain number of items with items above a particular affinity score threshold. Once identified, a selection of item recommendations may be made from the candidate item recommendations according to selection criteria, as indicated at 930. Selection criteria may, for instance, filter out from item recommendations those items which the particular user has previously selected (or a user from linked or associated with the particular user has selected). Selection criteria may use other types of collaborative or knowledge-based filtering techniques as selection criteria to perform selection of item recommendations (e.g., removing content considered inappropriate for a particular user account known to be associated with customer of a certain age, such as determined by item description information like a movie or television show rating).

The methods described herein may in various embodiments be implemented by any combination of hardware and software. For example, in one embodiment, the methods may be implemented by a computer system (e.g., a computer system as in FIG. 10) that includes one or more processors executing program instructions stored on a computer-readable storage medium coupled to the processors. The program instructions may be configured to implement the functionality described herein (e.g., the functionality of recommendation engines, model generation components, data stores and/or other components that implement the network-based enterprises, systems, or services described herein). The various methods as illustrated in the figures and described herein represent example embodiments of methods. The order of any method may be changed, and various elements may be added, reordered, combined, omitted, modified, etc.

Figure 10:
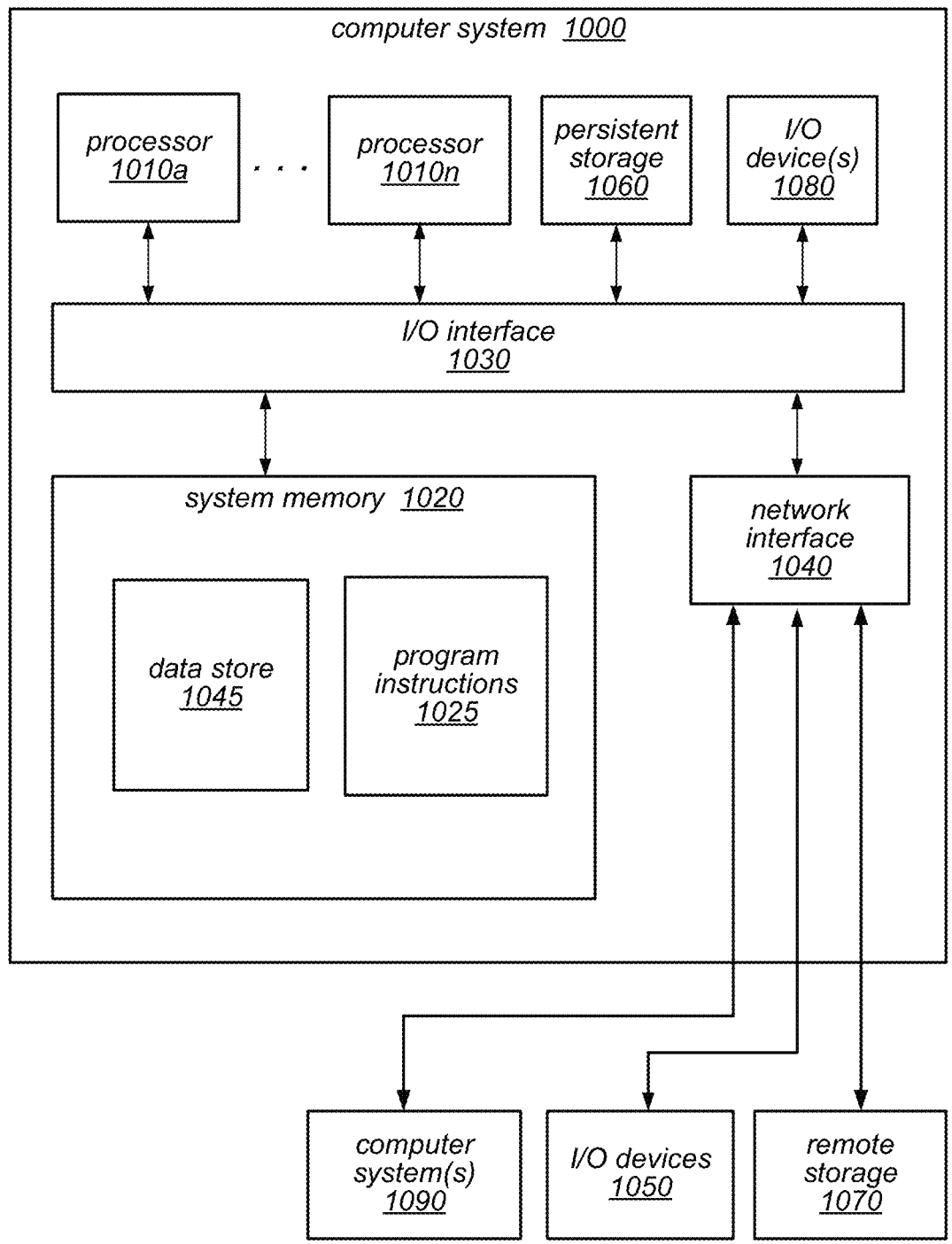
FIG. 10 is an example computer system, according to various embodiments.

FIG. 10 is a block diagram illustrating a computer system configured to implement real-time updates to item recommendation models based on item factorization described herein, according to various embodiments. For example, computer system 1000 may be configured to implement a real-time item recommendation engine, business logic, enterprise interface or a storage system that stores the item selection data and/or item recommendation model, in different embodiments. Computer system 1000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 1000 includes one or more processors 1010 (any of which may include multiple cores, which may be single or multi-threaded) coupled to a system memory 1020 via an input/output (I/O) interface 1030. Computer system 1000 further includes a network interface 1040 coupled to I/O interface 1030. In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA. The computer system 1000 also includes one or more network communication devices (e.g., network interface 1040) for communicating with other systems and/or components over a communications network (e.g. Internet, LAN, etc.). For example, a client application executing on system 1000 may use network interface 1040 to communicate with a server application executing on a single server or on a cluster of servers that implement one or more of the components of the database systems described herein. In another example, an instance of a server application executing on computer system 1000 may use network interface 1040 to communicate with other instances of the server application (or another server application) that may be implemented on other computer systems (e.g., computer systems 1090).

In the illustrated embodiment, computer system 1000 also includes one or more persistent storage devices 1060 and/or one or more I/O devices 1080. In various embodiments, persistent storage devices 1060 may correspond to disk drives, tape drives, solid state memory, other mass storage devices, or any other persistent storage device. Computer system 1000 (or a distributed application or operating system operating thereon) may store instructions and/or data in persistent storage devices 1060, as desired, and may retrieve the stored instruction and/or data as needed. For example, in some embodiments, computer system 1000 may host a storage system server node, and persistent storage 1060 may include the SSDs attached to that server node.

Computer system 1000 includes one or more system memories 1020 that are configured to store instructions and data accessible by processor(s) 1010. In various embodiments, system memories 1020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 1020 may contain program instructions 1025 that are executable by processor(s) 1010 to implement the methods and techniques described herein. In various embodiments, program instructions 1025 may be encoded in platform native binary, any interpreted language such as Java™ byte-code, or in any other language such as C/C++, Java™, etc., or in any combination thereof. For example, in the illustrated embodiment, program instructions 1025 include program instructions executable to implement the functionality of a real-time item recommendation engine (or module or component thereof), one or more computing systems, servers or nodes implementing a network-based enterprise, or storage systems that store the item selection data and/or the item recommendation model, in different embodiments. In some embodiments, program instructions 1025 may implement multiple separate clients, server nodes, and/or other components.

In some embodiments, program instructions 1025 may include instructions executable to implement an operating system (not shown), which may be any of various operating systems, such as UNIX, LINUX, Solaris™, MacOS™, Windows™, etc. Any or all of program instructions 1025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1000 via I/O interface 1030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1000 as system memory 1020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1040.

In some embodiments, system memory 1020 may include data store 1045, which may be configured as described herein. For example, the information described herein as being stored by persistent storage, such as the item selection data or the item recommendation model described herein may be stored in data store 1045 or in another portion of system memory 1020 on one or more nodes, in persistent storage 1060, and/or on one or more remote storage devices 1070, at different times and in various embodiments. In general, system memory 1020 (e.g., data store 1045 within system memory 1020), persistent storage 1060, and/or remote storage 1070 may store data blocks, replicas of data blocks, metadata associated with data blocks and/or their state, data storage configuration information, and/or any other information usable in implementing the methods and techniques described herein.

In one embodiment, I/O interface 1030 may be configured to coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems 1090 (which may implement one or more storage system server nodes, enterprise system nodes, and/or clients of the network-based enterprise systems described herein), for example. In addition, network interface 1040 may be configured to allow communication between computer system 1000 and various I/O devices 1050 and/or remote storage 1070. Input/output devices 1050 may, in some embodiments, include one or more display terminals, keyboards, keypads, touchpads, scanning devices, voice or optical recognition devices, or any other devices suitable for entering or retrieving data by one or more computer systems 1000. Multiple input/output devices 1050 may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1040. Network interface 1040 may commonly support one or more wireless networking protocols (e.g., Wi-Fi/IEEE 802.11, or another wireless networking standard). However, in various embodiments, network interface 1040 may support communication via any suitable wired or wireless general data networks, such as other types of Ethernet networks, for example. Additionally, network interface 1040 may support communication via telecommunications/telephony networks such as analog voice networks or digital fiber communications networks, via storage area networks such as Fibre Channel SANs, or via any other suitable type of network and/or protocol. In various embodiments, computer system 1000 may include more, fewer, or different components than those illustrated in FIG. 10 (e.g., displays, video cards, audio cards, peripheral devices, other network interfaces such as an ATM interface, an Ethernet interface, a Frame Relay interface, etc.)

It is noted that any of the system embodiments described herein, or any of their components, may be implemented as one or more network-based services, which may or may not be distributed. For example, a real-time item recommendation may be implemented by a network-based enterprise that employs the systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations. though In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:
   a persistent data store, configured to maintain an item recommendation model comprising a user matrix and an item matrix that are generated from a singular value decomposition of a single matrix indicating respective item selections for individual ones of a plurality of users with regard to different ones of a plurality of items, wherein the user matrix and the item matrix indicate the respective selections of the plurality of users up to a particular point in time;
   one or more computing devices that include one or more respective processors that together implement a real-time item recommendation engine;
   the real-time item recommendation engine configured to:
   receive an item recommendation request for a user of the plurality of users, wherein one or more subsequent item selections for the particular user occurred after the particular point in time and are not included in the item recommendation model;
   in response to receiving the request:
   calculate a user-specific update for the user in the item recommendation model based, at least in part, on a user parameter vector for the user obtained from the user matrix and respective item parameter vectors obtained from the item matrix for the one or more items of the plurality of items subsequently selected by the user, wherein the user-specific update is calculated without performing another singular value decomposition to update the item recommendation model to include the one or more items subsequent item selections;
   based, at least in part on the item recommendation model and the user-specific update for the user, determine one or more item recommendations for the user; and
   respond to the item recommendation request with the one or more item recommendations.

2. The system of claim 1, wherein individual ones of the one or more subsequent item selections correspond to a particular rating out of a plurality of ratings, and wherein to calculate the user-specific update for the user in the item recommendation model, the real-time item recommendation engine is configured to:
   scale individual ones of the respective item parameter vectors according to the particular rating corresponding to the subsequent item selection; and
   perform vector addition to combine the user parameter vector and the respective item parameter vectors to generate the user-specific update for the user.

3. The system of claim 1, wherein the user is linked to one or more other users of the plurality of users, wherein one or more other the users linked to the user, and wherein to calculate the user-specific update for the user in the item recommendation model, the real-time item recommendation engine is configured to:
   perform vector addition to combine the user parameter vector for the user, respective user parameter vectors for the one or more users linked to the user, the respective item parameter vectors for the one or more subsequent item selections, and respective item parameter vectors for the one or more other subsequent item selections for the at least one user linked to the user to generate the user-specific update for the user.

4. The system of claim 1, wherein the one or more computing devices are implemented as part of a network-based enterprise offering for sale the plurality of items, wherein the plurality of users correspond to respective customer accounts of the network-based enterprise, wherein the item recommendation request is received for a customer account corresponding to the user, and wherein the system further comprises:
   a network-based interface configured to convey the one or more item recommendations for the customer account to the user.

5. The system of claim 1, wherein the one or more computing devices together implement a client device configured to select different ones of the plurality of items offered via a network-based enterprise, wherein the persistent data store is local block storage implemented as part of the client device, and wherein the item recommendation model is received from the network-based enterprise.

6. A method, comprising:
performing, by one or more computing devices:
obtaining access to an item recommendation model in a persistent data store, wherein said item recommendation model comprises a user matrix and an item matrix that are generated from a matrix factorization of a single matrix indicating respective item selections for individual ones of a plurality of users with regard to a plurality of items, wherein the user matrix and the item matrix include the respective selections of the plurality of users up to a particular point in time;
calculating a user-specific update for the item recommendation model for a user of the plurality of users, wherein one or more subsequent item selections for the particular user occurred after the particular point in time and are not included in the item recommendation model, wherein said calculation is based, at least in part, on a user parameter vector for the user obtained from the user matrix and respective item parameter vectors obtained from the item matrix for the one or more items of the plurality of items subsequently selected by the user, wherein the user-specific update is calculated without performing another singular value decomposition to update the item recommendation model to include the one or more items subsequent item selections; and
based, at least in part on the item recommendation model and the user-specific update for the user, determining one or more item recommendations for the user.

7. The method of claim 6, wherein the plurality of items comprise:
digital media;
physical products; or
services.

8. The method of claim 6, wherein said calculating the user-specific update for the item recommendation model for the user of the plurality of users, comprises:
accessing a persistent data store maintaining item selection data for the user to obtain the respective item selections for the user including the one or more subsequent item selections for the user, wherein each of the plurality of item selections indicates a respective point in time that the item selection occurred;
comparing the respective points in time for the plurality of items with the particular point in time in order to identify the one or more subsequent item selections for the user that occurred after the particular point in time;
accessing the persistent data store maintaining the item recommendation model to obtain the user parameter vector for the user and the respective item parameter vectors obtained for the identified one or more items subsequently selected; and
performing vector addition to combine the user parameter vector and the respective item parameter vectors to generate the user-specific update for the user.

9. The method of claim 8, wherein individual ones of the one or more subsequent item selections correspond to a particular rating out of a plurality of ratings, and wherein said calculating the user-specific update for the user in the item recommendation model further comprises:
prior to performing the vector addition, scaling individual ones of the respective item parameter vectors according to the particular rating corresponding to the subsequent item selection.

10. The method of claim 6, wherein the user is linked to one or more other users of the plurality of users, and wherein said calculating the user-specific update for the user in the item recommendation model, comprises:
scaling respective user parameter vectors for individual ones of the one or more other users linked to the user according to one or more user recommendation weights; and
performing vector addition to combine the respective user parameter vector for the user and the scaled respective user parameter vectors for the other users linked to the user to generate the user-specific update.

11. The method of claim 6, further comprising:
identifying one or more other users of the plurality of users linked to the user;
obtaining respective user parameter vectors for individual ones of the one or more other users linked to the user and respective item parameter vectors for one or more subsequently selected items for the one or more other users;
generating one or more respective item recommendations for individual ones of the one or more other users linked to the user based, at least in part, on a calculated user-specific update for individual ones of the one or more other users determined from the respective user parameter vectors and the respective item parameter vectors;
comparing the one or more respective item recommendations for individual ones of the one or more other users linked to the user with the determined one or more item recommendations for the user in order select one or more commonly recommended items to be sent to the user for recommendation.

12. The method of claim 6, further comprising:
receiving an item recommendation request for the user;
in response to receiving the request:
performing said calculating and said determining the one or more item recommendations; and
responding to the request with the one or more item recommendations.

13. The method of claim 12, further comprising:
receiving an item recommendation request for another user of the plurality of users;
based, at least in part on the item recommendation model, determining another one or more item recommendations, wherein no item selections for the other user have occurred after the particular point in time such that a user-specific update for the other user is not calculated; and
responding to the item recommendation request for the other user with the other one or more item recommendations.

14. The method of claim 6, wherein the one or more computing devices are implemented as part of a network-based enterprise offering for sale the plurality of items, and wherein the plurality of users correspond to respective customer accounts of the network-based enterprise, and wherein the one or more item recommendations are conveyed via a network-based interface for the network-based enterprise.

15. A non-transitory, computer-readable storage medium, storing program instructions that when executed by one or more computing devices cause the one or more computing devices to implement:

maintaining an item recommendation model in a persistent data store, wherein said item recommendation model comprises a user matrix and an item matrix that are generated from a singular value decomposition of a single matrix indicating respective item selections for individual ones of a plurality of users with regard to a plurality of items, wherein the user matrix and the item matrix include the respective selections of the plurality of users up to a particular point in time;

calculating a user-specific update for the item recommendation model for a user of the plurality of users, wherein one or more subsequent item selections for the particular user occurred after the particular point in time and are not included in the item recommendation model, wherein said calculation is based, at least in part, on a user parameter vector for the user obtained from the user matrix and respective item parameter vectors obtained from the item matrix for the one or more items of the plurality of items subsequently selected by the user, wherein the user-specific update is calculated without performing another singular value decomposition to update the item recommendation model to include the one or more items subsequent item selections; and based, at least in part on the item recommendation model and the user-specific update for the user, determining one or more item recommendations for the user.

16. The non-transitory, computer-readable storage medium of claim 15, wherein individual ones of the one or more subsequent item selections correspond to a particular rating out of a plurality of ratings, and wherein, in said calculating the user-specific update for the user in the item recommendation model, the program instructions cause the one or more computing devices to implement:

scaling individual ones of the respective item parameter vectors according to the particular rating corresponding to the subsequent item selection; and performing vector addition to combine the user parameter vector and the respective item parameter vectors to generate the user-specific update for the user.

17. The non-transitory, computer-readable storage medium of claim 15, wherein the user is linked to one or more other users of the plurality of users, wherein one or more other subsequent item selections have occurred after the particular point in time for at least one of the users linked to the user, and wherein, in said calculating the user-specific update for the user in the item recommendation model, the program instructions cause the one or more computing devices to implement:

performing vector addition to combine the user parameter vector for the user, respective user parameter vectors for the one or more users linked to the user, the respective item parameter vectors for the one or more subsequent item selections, and respective item parameter vectors for the one or more other subsequent item selections for the at least one user linked to the user to generate the user-specific update for the user.

18. The non-transitory, computer-readable storage medium of claim 17, wherein the program instructions cause the one or more computing devices to implement:

identifying the one or more other users of the plurality of users linked to the user, wherein said identification is based, at least in part, one or more social media associations between the user and the or more other users.

19. The non-transitory, computer-readable storage medium of claim 15, wherein, in said determining the one or more item recommendations for the user, the program instructions cause the one or more computing devices to implement:

identifying a plurality of candidate item recommendations; and selecting the one or more item recommendations from the plurality of candidate item recommendations according to one or more selection criteria.

20. The non-transitory, computer-readable storage medium of claim 14, wherein the program instructions further cause the one or more computing devices to implement:

receiving an item recommendation request for the user;

in response to receiving the request:
performing said calculating and said determining the one or more item recommendations; and
responding to the request with the one or more item recommendations.

21. The non-transitory, computer-readable storage medium of claim 14, wherein the one or more computing devices are implemented as a client device that selects items of the plurality of items offered via a network-based media streaming service, wherein the plurality of items correspond to different respective media available via the network-based media streaming service, and wherein the plurality of users correspond to respective customer accounts of the network-based media streaming service.

* * * * *